Patented Aug. 30, 1927.

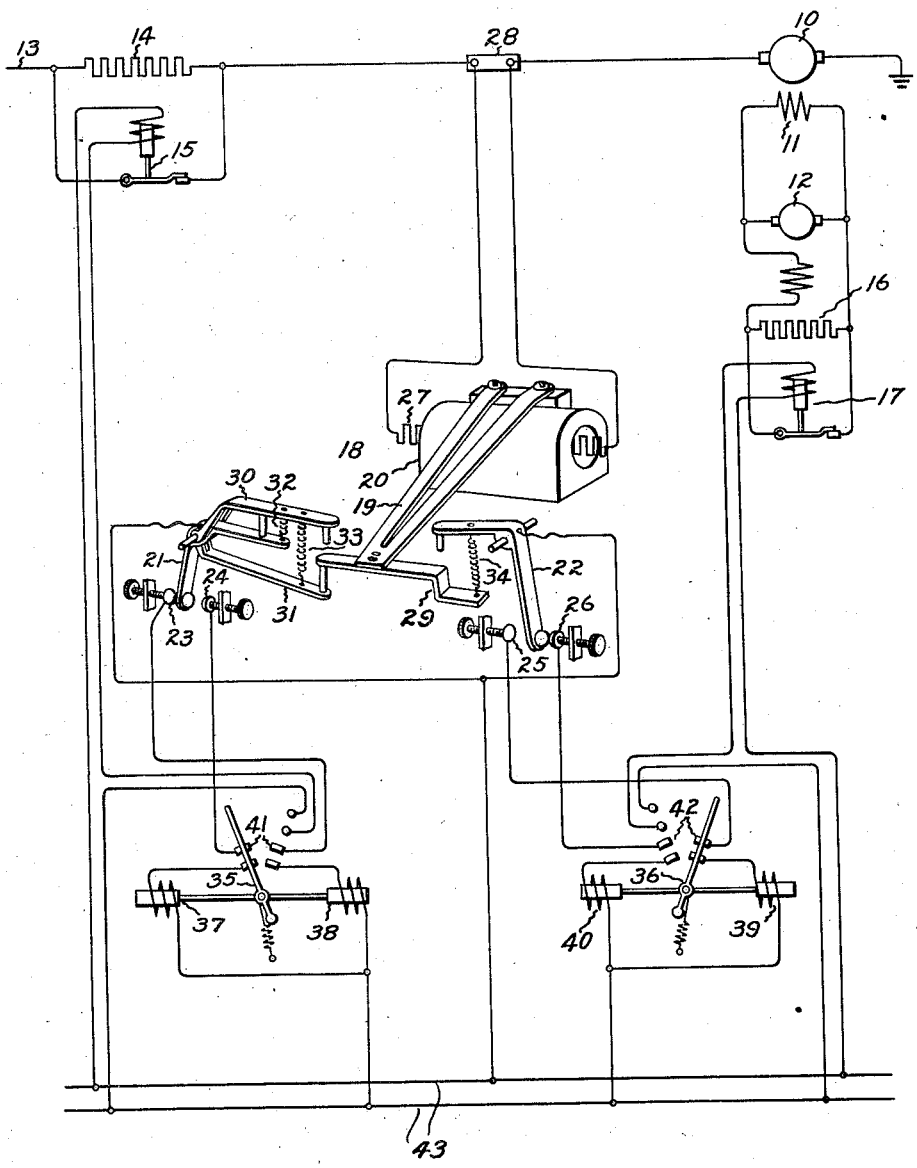

1,640,447

UNITED STATES PATENT OFFICE.

CHESTER I. HALL, OF FORT WAYNE, INDIANA, ASSIGNOR TO GENERAL ELECTRIC COMPANY, A CORPORATION OF NEW YORK.

THERMAL-RESPONSIVE SWITCH MECHANISM AND PROTECTIVE SYSTEM EMPLOYING THE SAME.

Original application filed December 16, 1924, Serial No. 756,343. Divided and this application filed March 4, 1926. Serial No. 92,303.

This application is a division of my application Serial No. 756,343, filed December 16, 1924.

The invention relates to thermal responsive switch mechanisms and to protective systems for electric translating devices employing the same.

One of the objects of the invention is to provide an improved form of thermal responsive switch mechanism having circuit controlling members arranged so as to control the closure and opening of a plurality of electrically operated switches at different predetermined temperatures.

A further object of the invention is to provide an improved arrangement of control apparatus and circuits whereby a thermal responsive control switch mechanism of the above character is effective to automatically prevent overheating of an electric translating device.

Although my invention is not necessarily limited thereto, it has a particular application in controlling the load on an electric generator to protect the same from overheating. A generator supplying current to an electric railway system requires protection from overheating because of the fact that the load varies between wide limits. Thus, at certain times the load may be of a nominal value, whereas at other times the load may be greater than the normal rated load of the generator. However, no dangers are encountered if the overloads are not too great in value, do not persist for too long a time and are not repeated at too frequent intervals since generators are ordinarily built to withstand definite percentages of overload for limited periods of time without injury. Hence it is desirable that an automatic thermal responsive protective arrangement for such a generator should substantially follow the heating characteristics thereof in order that an overload on the generator may be reduced before the resulting heating of the generator produces a dangerous temperature. Also it is desirable that the reduction in the load be merely sufficient to prevent the generator from attaining a dangerous temperature. Thus, for example, the generator may be designed to carry 110% of normal rated load for a certain time interval and 120% of rated load for a shorter time interval and therefore the protective arrangement should insure that when the time interval during which the 110% load is carried is greater than the predetermined value, the load on the generator shall be automatically reduced, and when the time interval for which the 120% load is carried is greater than the predetermined value, the load of the generator shall be still further reduced. Also it is desirable that the load shall be automatically restored to the generator in case the temperature of the generator warrants the restoration of the load, and that only so much of the load may be restored as is safe for the generator. Furthermore, it may be desired that the values of temperature of the generator at which the load thereon is to be either decreased or increased shall be capable of being accurately and independently adjusted and that the thermal responsive element of the controlling device is required to merely complete an electric circuit and is never called upon to interrupt a circuit.

In accordance with my invention a thermal responsive device and a system of control is obtained wherein a single thermal responsive element having thermal characteristics duplicating those of the generator to be protected is effective to accomplish the above results in a simple and reliable manner.

For a better understanding of the invention reference is had to the following description taken in connection with the accompanying drawing in which the single figure diagrammatically shows a preferred form of my improved temperature relay embodied in a temperature protective system for an electric generator.

The novel features and combinations which I believe to be characteristic of my invention are pointed out with particularity in the appended claims.

Referring to the drawing, an electric generator 10 having a field winding 11 separately excited from the exciter 12, is connected to supply power to the supply line 13. The current regulating resistance 14 and the electromagnetic switch 15 for controlling the same are provided for limiting the current output of generator 10, and the regulating resistance 16 and the electromagnetic switch 17 for controlling the same are connected in the field circuit of exciter 12 in order to vary the voltage thereof and thereby control the excitation of generator 10.

In order to prevent overheating of generator 10, under continued overload conditions, a temperature relay 18 preferably of the form described and specifically claimed in my application Serial No. 756,343, filed December 16, 1924, of which my present application is a division, is arranged to operate the electromagnetic switches 15 and 17 to successively vary the current and the voltage of generator 10 in a manner which will be more fully described in connection with the operation of my invention.

As shown the temperature relay 18 comprises a bi-metallic thermal responsive movable element 19, one end of which is suitably secured in heat conducting relation with the electrically heated storage mass 20. The free end of element 19 is operatively connected to move the pivoted circuit controlling members 21 and 22 respectively between the stationary contacts 23, 24, and 25, 26, cooperating therewith. A suitable resistor 27 is provided for heating the heat storage mass 20 and is connected to the shunt 28 to be energized responsively to the current of generator 10. The heat storage mass 20 together with the termal responsive element 19 are designed to have thermal characteristics substantially duplicating those of the generator 10 when the generator is heated by moderate overloads long continued. The thermal element 19 is operatively connected to the circuit controlling members 21 and 22 by means of the operating arm 29 which is secured to the free end of the thermal element. This arm 29 is yieldingly connected to the member 21 through the coaxially pivoted levers 30 and 31 and the tension springs 32 and 33, and to the member 22 through the tension spring 34. As will more fully appear hereinafter, the yielding connections between the thermal element 19 and the circuit controlling members 21 and 22 permit the sequential operation of these members between their circuit controlling positions upon flexure of the thermal element 19 responsively to variations in the temperature thereof.

In order to insure the opening and closing of the control circuits of electromagnetic switches 15 and 17, with a snap action, the temperature protective relay 18 is provided with the auxiliary electromagnetic switches 35 and 36 which are arranged to be operated under the control of the thermally actuated circuit controlling members 21 and 22 respectively. The auxiliary switch 35 is arranged to be electromagnetically operated to the circuit closing position as well as the circuit opening position in which it is shown by means of the operating electromagnets 37 and 38 respectively and the auxiliary switch 36 likewise is provided with a pair of operating electromagnets 39 and 40 for electromagnetically operating the switch to each position. Each of the auxiliary switches 35 and 36 is provided with suitable means such as the biasing springs indicated in the drawing for biasing the switch to the last position to which it is operated. However, it will be evident to those skilled in the art that the control circuits of electromagnetic switches 15 and 17 may be arranged to be controlled directly by the circuit controlling members 21 and 22 if desired, although the arrangement shown is preferable since the thermally actuated members 21 and 22 are not called upon to interrupt a circuit as will more fully appear hereinafter.

The arrangement of the auxiliary contact mechanisms 41 and 42 with which the auxiliary electromagnetic switches 35 and 36 respectively are provided as well as the circuit connections whereby the electromagnetic switches 15, 17, 35, and 36 are energized from the supply lines 43 will be more fully understood from the description of the operation of my invention which is as follows:

Assuming that the supply lines 43 are energized from a suitable source of supply, and that the generator 10 is supplying only a minimum amount of power to the supply line 13, the temperature of generator 10 will be at a safe operating value and likewise the temperature of thermal responsive element 19 of the temperature relay 18 will be at a correspondingly low value. Under these conditions the several operating parts of the thermal responsive relay 18 as well as the switches 15, 17, 35 and 36 will occupy the positions shown in the drawing.

With an increased demand on the supply line 13, the current output of generator 10 increases and the heating of the generator as well as the heating effect applied to the heat storage means 20 and the thermal responsive element 19 is increased correspondingly. Should the generator 10 become overloaded sufficiently to raise the temperature thereof to an unsafe value, the temperature of the thermal responsive element 19 is similarly increased and the free end thereof is gradually raised from the position in which it is shown in the drawing as the element flexes in response to the increased temperature. When the temperature of element 19 reaches a predetermined value, the operating arm 29 is carried into engagement with the lever 30 and operates the circuit controlling member 21 out of engagement with the adjustable contact 23. Should the temperature of element 19 continue to increase to a higher predetermined value, the arm 29 is engaged with the end of circuit controlling member 22 to disengage the same from the contact 26.

If the temperature of element 19 continues to increase and the free end of the element continues to flex in an upward direction, the circuit controlling member 21 is moved into circuit closing engagement with the contact 24 at a still higher predetermined temperature. It will be understood that this temperature may represent any desired overload upon the generator 10 such as for example 110% load as determined by the setting of the adjustable contact 24.

When the circuit controlling member 21 engages with contact 24, the operating electromagnet 37 of switch 35 is energized from the supply lines 43 through a circuit extending from the lower supply line through the operating winding of electromagnet 37, the left hand contacts of auxiliary mechanism 41, the contact 24 and circuit controlling member 21 of temperature relay 18 to the upper supply line. Electromagnet 37 thereupon quickly and positively operates the switch 35 from the open position in which it is shown to the closed position, the energizing circuit of the electromagnet 37 being opened at the left hand contacts of auxiliary mechanism 41 after the switch 35 has been thrown over center so that the switch is closed with a snap action by suitable biasing means as indicated in the drawing. The closure of switch 35 at once energizes the operating winding of electromagnetic switch 15 from the supply lines 43 and the latter responds to open the short circuit around the regulating resistance 14 and insert the same in the power circuit of generator 10. This reduces the current output of generator 10 and if the overload is not excessive the reduction in output effected by the regulating resistance 14 will be sufficient to prevent further overheating of the generator 10.

If, however, the overload is more severe, and the current output of generator 10 is such as to further increase the temperature thereof it will be evident that the temperature of thermal element 19 will be gradually increased in a corresponding amount. Under these conditions the element 19 continues to flex and move the operating levers 30 and 31 about their pivotal support. Although the circuit controlling member 21 is stopped from further movement by the contact 24, the spring 32 yields to permit continued movement of circuit controlling member 22 and levers 30 and 31 by the thermal element 19. At a predetermined high temperature which may correspond to 120 per cent load on generator 10 the circuit controlling member 22 is moved into engagement with the adjustable contact 25, thereby establishing an energizing circuit for operating electromagnet 39 of switch 36 extending from the lower of the supply lines 43 through the winding of electromagnet 39, the right hand contacts of auxiliary switch mechanism 42, the contact 25, and circuit controlling member 22 to the upper of the supply lines 43. This effects the closure of switch 36 with a snap action in a manner similar to that previously described in connection with switch 35, and the closure of the switch 36 energizes the electromagnet 17 from the supply line 43 in an obvious manner.

Upon the resulting opening of switch 17, the short circuit around the resistance 16 is removed and the latter is inserted in the field circuit of exciter 12 to reduce the voltage thereof and correspondingly reduce the energizing current of the field winding 11 of generator 10. The consequent reduction in voltage of generator 10 causes the current output thereof to decrease to a safe value which may be continued without injuriously overheating the generator.

When the excessive demand on supply line 13 decreases and the current of generator 10 is reduced to a value at which the temperature of the generator begins to decrease, the temperature of thermal element 19 will also decrease in a similar manner. The resulting downward flexure of the free end of element 19 successively moves circuit controlling members 22 and 21 out of engagement with the contacts 26 and 24 respectively. As the cooling of thermal element 19 continues, it will be evident that the circuit controlling member 22 is first carried into engagement with the contact 25 to operatively energize the electromagnet 40 and thereby return the switch 36 to the open position and deenergize the electromagnetic switch 17. The resulting closure of switch 17 again establishes a short circuit around the resistance 16 and increases the energization of the field winding 11 of generator 12 to normal value. It will be understood that the predetermined temperature at which the voltage of generator 10 is returned to normal value may correspond to any desired value of load on generator 10 such as for example 103% load depending upon the setting of adjustable contact 25.

If, however, the load on generator 10 is below the normal rated value, the temperature of the generator as well as the thermal responsive element 19 will continue to decrease until at a lower predetermined temperature the flexure of element 19 is sufficient to carry the circuit controlling member 21 into engagement with contact 23. Thereupon, the operating electromagnet 38 is energized to open the switch 35 and thereby deenergize the electromagnet switch 15.

The closure of switch 15 again short circuits the resistor 14 and the generator 10 continues to supply the normal power requirements of supply line 13.

While not shown in the drawing, it will be evident that suitable circuit interrupting apparatus may be provided for protecting the generator 10 against extremely severe overload such as would occur under short circuited conditions or the like, the arrangement as shown being intended to protect against moderate overloads long continued.

While I have described the temperature relay 18 as arranged to effect the energization and deenergization of electromagnet switches 15 and 17 upon the occurrence of certain predetermined temperature conditions in generator 10, it will be understood that by suitable adjustment of the contacts 23, 24, and 25 and 26, the opening and closing of these switches may be affected at other values of temperature if desired.

From the foregoing it will be evident that my improved form of thermally actuated switch mechanism may be employed for controlling the opening and closing of separate circuits in a desired sequence and that a temperature relay and a temperature protective system embodying the invention affords adequate protection to the electric translating device, decreasing the load for dangerous temperatures and automatically adding load as the temperature drops to predetermined values.

In accordance with the provisions of the patent statutes, I have described the principle of operation of my invention together with the apparatus which I now consider to represent the best embodiment thereof, but I would have it understood that the apparatus shown is only illustrative, and that the invention may be carried out by other means.

What I claim as new and desire to secure by Letters Patent of the United States, is:

1. The combination with a plurality of electric switches, each operable between a plurality of positions and having electro-responsive means for operating the same to each position, of a thermal responsive movable element, and control switch mechanism connected to be actuated by said element for controlling said means to separately operate each of said electric switches to each position responsively to a different predetermined temperature of said element.

2. The combination with a pair of electric switches, each having an open and a closed position and an electromagnet for operating the same to each position, of a thermal responsive movable element, control switch mechanism connected to be actuated by said element, auxiliary contact mechanism associated with each of said electric switches, and connections jointly controlled by said switch mechanism and said contact mechanism for separately energizing the operating electromagnets of said switches to open and close the same responsively to different predetermined temperatures of said element.

3. A temperature protective control for an electric translating device, comprising a plurality of electric switches, each having an open and a closed position and an electromagnet for operating the same to each position, an electrically heated heat storage mass having thermal characteristics substantially duplicating those of the electrical device to be protected, a bi-metallic thermal responsive movable element having one end secured in heat conducting relation with said mass, control switch mechanism mechanically connected to the other end of said element to be operated thereby to each of a plurality of positions responsively to different predetermined temperatures of said mass, and connections whereby a corresponding one of the operating electromagnets of said switches is energized upon the operation of said control switch mechanism to each of said positions.

4. In combination, a dynamo electric machine, a current limiting resistance arranged to be connected in the power circuit of said machine to limit the current thereof, a resistor for controlling the voltage of said machine, a thermal responsive relay arranged to be heated responsively to the current of the said machine, and switch mechanism controlled by said relay for successively inserting said resistance in the power circuit of said machine and varying said resistor to reduce the voltage of said machine upon a continued overload current therein.

5. In combination, a dynamo electric machine, means including an electromagnetic switch for controlling the current of said machine, means including a second electromagnetic switch for controlling the voltage of said machine, and a temperature relay having thermal characteristics substantially duplicating those of said machine and arranged to be heated in accordance with the current of said machine for controlling said electromagnetic switches to prevent overheating of said machine.

6. In combination, a dynamo electric machine, a resistance connected in the power circuit of said machine, an electromagnetic switch for controlling a short circuit around said resistance, a second resistance for controlling the voltage of said machine, a second electromagnetic switch for controlling a short circuit around said resistance, and a thermal responsive element having thermal characteristics substantially duplicating those of said machine and arranged to be heated in accordance with the current of said machine for successively controlling said switches to reduce the current and the voltage of said machine upon the occurrence of overload conditions.

In witness whereof, I have hereunto set my hand this 1st day of March, 1926.

CHESTER I. HALL.